Patented June 22, 1926.

1,590,091

UNITED STATES PATENT OFFICE.

FRIEDRICH HEUSLER, OF DILLENBURG, GERMANY, ASSIGNOR TO THE FIRM OF ISABELLENHUETTE GESELLSCHAFT MIT BESCHRÄNKTER HAFTUNG, OF DILLENBURG, GERMANY.

SILVER ALLOY.

No Drawing. Application filed August 29, 1921, Serial No. 496,598, and in Germany September 13, 1920.

The present invention relates to alloys containing silver. It is usual at present to alloy silver with copper so as to increase its hardness and render it suitable for use in the manufacture of coins or table ware as forks and spoons. According to the present invention the silver is alloyed with manganese and aluminium or with manganese-copper and aluminium and these alloys are distinguished by great tensile strength and hardness much greater than possessed by the old silver-copper alloys. It was further found that the tensile strength and hardness of such alloys was still considerably increased if after having been rolled in the usual manner, they were subsequently heated for a prolonged period at a suitable temperature. These properties of the new alloys render them far more suitable for the manufacture of the above mentioned articles for the reason that they are capable of standing wear much better than the articles made from the silver-copper alloys.

A further advantage of an alloy made in accordance with my invention is that when the various contents are properly chosen the finished alloy has magnetic properties which together with its wear and resisting qualities and hardness renders it particularly useful for making coins owing to the difficulty of counterfeiting.

As an example how to carry this invention into effect an alloy is prepared containing 80% silver, about 9% of aluminium and about 13 to 11% of the commercial manganese copper alloy. This alloy is rolled at a dull red heat and while still red hot it is quenched in water.

Now what I claim is:

An alloy for the manufacture of coin silver prepared from the following materials in substantially the proportions specified: silver 80%, aluminum 9% and manganese 11%.

In testimony whereof I have affixed my signature.

DR. FRIEDRICH HEUSLER.